(12) United States Patent
Davis et al.

(10) Patent No.: US 8,007,666 B1
(45) Date of Patent: *Aug. 30, 2011

(54) APPARATUS FOR SANITIZING WATER DISPENSED FROM A WATER DISPENSER HAVING A RESERVOIR

(75) Inventors: Kenneth A. Davis, Mendeville, LA (US); James Jackson Shelton, Alpine, TX (US)

(73) Assignee: S.I.P. Technologies L.L.C., New Orleans, LA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/126,545

(22) Filed: May 23, 2008

Related U.S. Application Data

(62) Division of application No. 10/967,812, filed on Oct. 18, 2004, now Pat. No. 7,422,684.

(60) Provisional application No. 60/511,986, filed on Oct. 16, 2003.

(51) Int. Cl.
*C02F 1/78* (2006.01)

(52) U.S. Cl. ............... 210/192; 210/197; 210/198.1; 210/416.3; 210/418; 261/DIG. 42; 222/190

(58) Field of Classification Search .......... 210/192, 210/197, 98.1, 205, 416.3, 418; 261/28, 261/29, 87, DIG. 42; 222/190
See application file for complete search history.

(56) References Cited

U.S. PATENT DOCUMENTS

| | | |
|---|---|---|
| 1,403,025 A | 1/1922 | Haase |
| 2,093,619 A | 9/1937 | Powell |
| 2,947,525 A | 8/1960 | Klein |
| 3,382,980 A | 5/1968 | Siilva |
| 3,448,045 A | 6/1969 | Hess et al. |
| 3,692,180 A | 9/1972 | Laraus |
| 3,726,404 A | 4/1973 | Troglione |
| 3,843,521 A | 10/1974 | Zeff |
| 3,967,131 A | 6/1976 | Slipiec |
| 3,970,731 A | 7/1976 | Oksman |
| 4,019,986 A | 4/1977 | Burris et al. |
| 4,035,657 A | 7/1977 | Carlson |
| 4,193,949 A | 3/1980 | Naito |
| 4,341,641 A | 7/1982 | Novak |
| 4,410,495 A | 10/1983 | Bassler |
| 4,764,349 A | 8/1988 | Arff |
| 4,776,127 A | 10/1988 | Jackson |
| 4,805,808 A | 2/1989 | Larson |
| 4,842,723 A | 6/1989 | Parks et al. |
| 5,015,394 A | 5/1991 | McEllhenney et al. |

(Continued)

FOREIGN PATENT DOCUMENTS

JP HEI 3-55479 3/1991

(Continued)

*Primary Examiner* — Matthew Savage
(74) *Attorney, Agent, or Firm* — Garvey, Smith, Nehrbass & North, L.L.C.; Charles C. Garvey, Jr.; Vanessa M. D'Souza

(57) ABSTRACT

A method and apparatus of sanitizing drinking water to be dispensed from a water dispenser having a reservoir includes the steps of providing the ozone gas generator that generates an ozone gas stream, transmitting the ozone gas stream from the generator to the water dispenser reservoir, mechanically breaking up the ozone gas stream inside the reservoir to produce ozone gas bubbles, and using the ozone gas bubbles to disinfect water in the reservoir. The ozone gas stream can be mechanically broken up using a pump such as, for example, an impeller type pump.

5 Claims, 5 Drawing Sheets

U.S. PATENT DOCUMENTS

| | | |
|---|---|---|
| 5,106,495 A | 4/1992 | Hughes |
| 5,256,282 A | 10/1993 | Chang |
| 5,295,519 A | 3/1994 | Baker et al. |
| 5,328,059 A | 7/1994 | Campbell |
| 5,366,619 A | 11/1994 | Matsui et al. |
| 5,431,861 A | 7/1995 | Nagahiro et al. |
| 5,503,809 A | 4/1996 | Coate |
| 5,531,908 A | 7/1996 | Matsumoto et al. |
| 5,567,322 A | 10/1996 | Rundle et al. |
| 5,567,332 A | 10/1996 | Mehta |
| 5,582,717 A | 12/1996 | Di Santo |
| 5,587,089 A | 12/1996 | Vogel et al. |
| 5,632,268 A | 5/1997 | Ellis et al. |
| 5,669,221 A | 9/1997 | LeBleu et al. |
| 5,683,576 A | 11/1997 | Olsen |
| 5,698,164 A | 12/1997 | Kishioka |
| 5,862,975 A | 1/1999 | Childress |
| 5,871,701 A | 2/1999 | Long |
| 6,050,474 A | 4/2000 | Aota et al. |
| 6,053,391 A | 4/2000 | Heideman et al. |
| 6,085,540 A | 7/2000 | Davis |
| 6,149,804 A | 11/2000 | Chung et al. |
| 6,247,633 B1 | 6/2001 | White et al. |
| 6,270,733 B1 | 8/2001 | Rodden |
| 6,289,690 B1 | 9/2001 | Davis |
| 6,328,261 B1 | 12/2001 | Wollaston et al. |
| 6,389,690 B1 | 5/2002 | McCullough et al. |
| 6,405,387 B1 | 6/2002 | Barnes |
| 6,481,219 B2 | 11/2002 | Palermo |
| 6,532,760 B2 | 3/2003 | Davis |
| 6,561,382 B2 | 5/2003 | Shelton |
| 6,568,900 B2 | 5/2003 | Conrad et al. |
| 7,422,684 B1 * | 9/2008 | Davis et al. .................. 210/192 |
| 2003/0071069 A1 | 4/2003 | Shelton |
| 2004/0074252 A1 | 4/2004 | Shelton |
| 2005/0236432 A1 | 10/2005 | Davis |

FOREIGN PATENT DOCUMENTS

| | | |
|---|---|---|
| WO | WO 93/17725 | 9/1993 |
| WO | WO 97/42924 | 11/1997 |
| WO | WO/00/38815 | 7/2000 |
| WO | WO 02/02706 | 1/2002 |

* cited by examiner

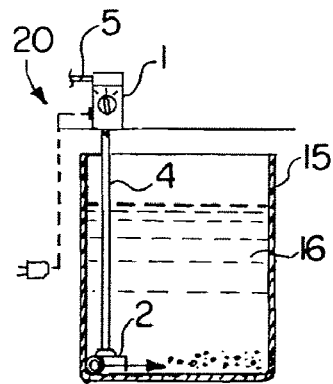
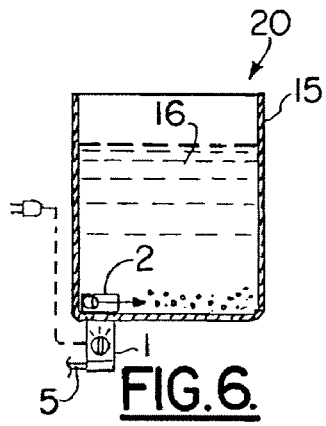
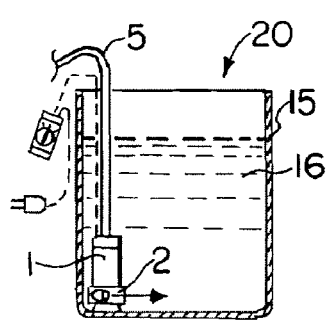
FIG. 5.  FIG. 6.  FIG. 7.
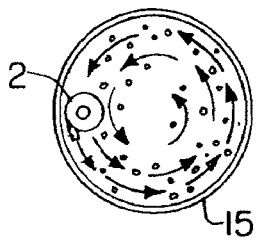
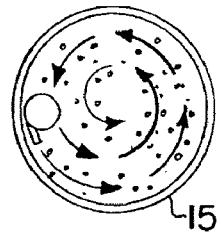
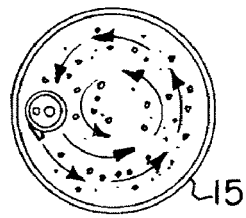
FIG. 5A.  FIG. 6A.  FIG. 7A.
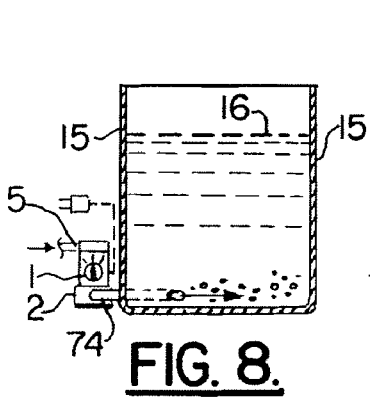
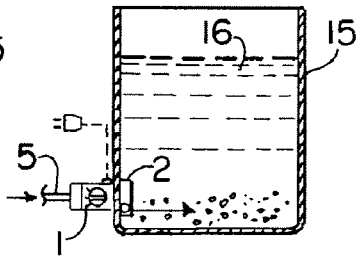
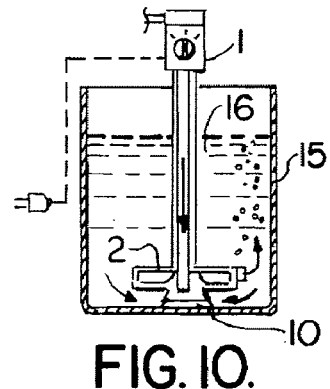
FIG. 8.  FIG. 9.  FIG. 10.
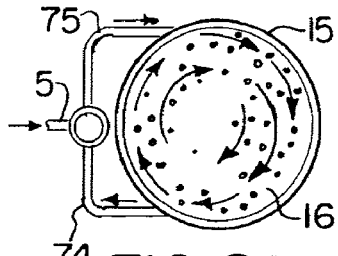
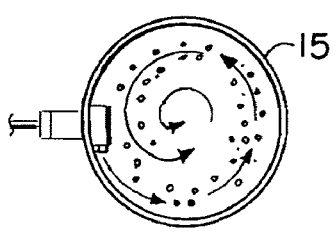
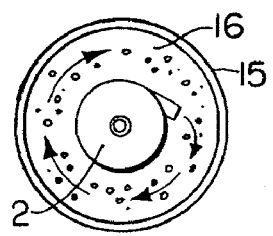
FIG. 8A.  FIG. 9A.  FIG. 10A.

APPARATUS FOR SANITIZING WATER DISPENSED FROM A WATER DISPENSER HAVING A RESERVOIR

CROSS-REFERENCE TO RELATED APPLICATIONS

This is a divisional application of U.S. patent application Ser. No. 10/967,812, filed Oct. 18, 2004, now U.S. Pat. No. 7,422,684, incorporated herein by reference, priority to which is hereby claimed.

Priority of U.S. Provisional Patent Application Ser. No. 60/511,986, filed Oct. 16, 2003, incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to water dispensers including refrigerated and non-refrigerated water dispensers that provide a reservoir for holding water. More particularly, the present invention provides an improved method and apparatus for sanitizing drinking water to be dispensed from a water dispenser having a reservoir wherein ozone gas is generated and transmitted from a generator to the water dispenser reservoir, a pump being positioned inside the reservoir that enables the ozone gas mechanically broken up inside the reservoir to produce very small ozone gas bubbles that are used to disinfect the water in the reservoir and the reservoir floor.

2. General Background of the Invention

The EPA publication "Alternative Method's of Disinfection" relates that aerator diffusion systems have achieved over 95% ozone mass transfer diffusion efficiency when properly configured. The highest transfer efficiencies are achieved by any known conventional means used in large scale ozone water treatment applications. Aerators are special types of liquid pumps adapted to production of a mixed phase gas and liquid flow stream for the sole purpose of dissolving said gases into the liquid. Two types of conventional aerator pumps can be used for adaptation to the batch type water dispenser reservoir as the primary ozone diffusion means. The two conventional types are high shear centrifugal flow aerators as described for example by the Naito, U.S. Pat. No. 4,193,949, hereby incorporated herein by reference.

A centrifugal water pump impeller designed for aeration, as the name implies, pumps liquids by radial action of radial or spiral blades or tines. Such blades or tines are either sandwiched between two discs or affixed to a single disc. In most instances they act as a housing where water and a gas are draw in from either ports located near the axis or in the case of the single disc types open to the bulk liquid. This fluid is propelled radially outward by the radial-centrifugal pushing and slinging action of the plurality of vanes in rotary motion. Gas is typically supplied through ports in a hollow drive shaft or in the case of single disc open impeller models, from an annular opening formed between shaft and exterior sleeve in connecting with gas supply. In some models, the perimeter of the dual disc radial flow impeller is provided with a housing displaying a plurality of slots or a screen capable of further subdividing gas bubbles by shear between porous perimeter housing surface and tips of the blades and passage through the metered slots or screens.

Axial flow impellers pump water sourced from an axial supplying means through one or more pitched rotary screw impellers. These screw impellers propel water axially by pushing and form a region of low pressure on the water intake side, providing the means for gas siphoning to the liquid for shear mixing by the impeller. Variations range from thin dimension, low pitched shearing blades with one or more such impellers like those found on vortex action household blenders. These devices aerate and mix gases from the air gap with the liquid such as disclosed by Zeff, U.S. Pat. No. 3,843,521, hereby incorporated herein by reference. The Zeff '521 patented pump uses an impeller stack consisting of one or more high pitch drive impellers that pump water and provide maximum gas siphoning rates when stack is placed in a tubular housing. The most advanced stack models exhibit thin walled parabolic cross-sectioned net-zero pitched shearing blades lying between drive impellers that generate maximum turbulence and regions of high and low pressure within the flow stream capable of shearing a partial mixed gas phase down to fast dissolving non-buoyant, gas colloid-suspension dimensions.

Due to their increased gas siphoning ability without adverse gas flooding cavitation to impellers resulting in liquid flow stoppage, such pumps are often outfitted with positive pressure gas supplies capable of quickly gas saturating liquids.

Gas bubble volume to water mass transfer in open cooler reservoir systems with tuned aerator pumps can rotary shear gas bubbles down to micron dimensions found in pressured water venturi injection systems. Gas being a compressible fluid, when the venturi injection returns ozonated water flow to open systems cooler reservoir with corresponding pressure decrease, bubbles quickly increase to larger dimensions that quickly rise to reservoir air water interface and exhaust without effectively mass transferring any of the process ozone to water in the highly abbreviated water columns of cooler reservoirs.

Typically, low pressure, fine bubble diffuser stones are limited to production of bubbles no smaller than about 300 micron diameters with the majority of the bubble population capable of supporting adequate gas volumes for disinfecting reservoirs in contacting times ranging from 10-45 minutes with small output ozonators lie in the 400-600 micron diameter range, relatively slow rising and exhausting bubbles.

Diffusion efficiencies of cooler based diffuser stone based diffusion typically do not exceed 5-40% depending on ozonator output. Gas supply rates cannot exceed 2 liters per minute in the most prevalent 2 liter water volume form of cooler without turning the reservoir water volume to froth with the accompanying risk of inducing catastrophic cooler flooding in bottled water coolers and float regulated pressured supply point of use coolers.

When a point of use type water dispenser intake valve float drops due to loss of liquid head and allow pressured supply to continuously dump water into reservoir that in turn is continually converted to low density froth. Flooding can occur in these devices from overdriven ozone supply systems.

All of these deficiencies can be overcome with air flow rate and bubble size tuned aerator systems that are capable of circulating chiefly non-buoyant bubbles around in the reservoir and inhibiting the buoyant bubble size fractions from rising to the surface, exhausting with a swirling flow circulating around reservoir walls instead of toroidal water flow dynamics that roll to air water interface and back down. In effect, this feature greatly increases the contacting times of the larger bubble fractions. The very small non-buoyant fractions diffuse by pressure dynamics, diffusing to extinction in usually about 40 seconds are less. The larger buoyant fraction on the other hand must be diffused by the conventional motional transfer of external bubble film mixed phase gas-water stripping dynamics.

In cooler reservoir bubble reactors, the conventional method has not demonstrated itself to be an effective transfer means for low bubble rise velocity in abbreviated water column. Layer stripping diffusion of this bubble fraction requires considerable mechanical stirring action, as occurs with aerator circulation where the layer is stripped and contents dispersed within the bulk liquid by active mixing, decreasing gas solution density around bubble allowing the mixed phase layer to quickly replenish and be stripped again in a low dissolved gas environment. With continual stripping of bubbles whose initial size was 500-700 microns, bubble sizes diminish until they reach non-buoyant, fast pressure diffusion bubble dimension where viscous drag and circulation in excess of rise velocity holds these bubbles in suspension until they diffuse to extinction. This effect has been demonstrated with sparingly soluble ozone and air dissolving in water at water temperatures in excess of 75 F with aerator diffusion.

The rapid mass transfer effect is only accelerated in chilled water found in cooler reservoirs averaging about 38 degrees F. It is not uncommon in 2 liter chilled water volumes to gas saturate the water in less than about 4 minutes to the point continued aeration is a pointless waste of energy. Site generated ozone as dissolved ozone concentration peaks long before the remaining gas phase stored in small non-buoyant bubbles have depleted. The dissolved gas concentration effectively inhibits further gas transfer to the liquid. On return to static equilibrium conditions, post aerator diffusion, the reservoir water volume begins to demonstrate the milky liquid light dispersion appearance of a true, meta-stable gas colloid that will remain stable for days without off-gassing and returning to a clear state.

Due to the effectiveness of rotary mechanical shearing of gas to fine particulate dimensions and circulation capture of gas particles that one can achieve with aerator diffusion, aerators or their impellers can be located either near the reservoir air-water interface or (when operating near the bottoms of coolers) provided with a small water intake extension in addition to regular intake whose terminus lies relatively close to the interface to form a vortex capable of drawing exhaust phase ozone back down into the water where it can be recycled and transferred to water, reducing process ozone demand even further.

As long as the amount of exhaust gas quantity drawn into the mixer is small, the effect on primary process ozone siphoning is small and impeller cavitation will not occur. A further consideration is keeping ancillary extension's intake orifice small to eliminate the potential the reservoir flooding resulting from the formation of large vortices.

Another option open to axial flow housed impeller stack aerators, that of split flow transfer of ozonated water to other regions of a cooler include the ability to pump ozonated water from reservoir into water bottles of bottled water coolers. This results in pre-ozonating the source water and sanitizing the inner surfaces of bottles as well as its anti-spill device, the tubular hypodermic like protrusions that pierce special sanitary bottle caps. When bottled water and especially the tubes of anti-spill devices extend up into the clear bottles exposure to sunlight over extended periods causes algae to bloom in the bottle. This forms algal biofilms on both bottle and tubular extension surfaces that ozonated water will bleach and render inert. Since there is little air exchange associated suspended fine bubbles and dissolved ozone, the positive displacement ozonated water pumped into bottles, returning to reservoir by gravity flow at a rate equal to that pumped in, thus no danger of the disequilibria, air exchange cooler flooding exists.

Prior art addressing ozonating water in the bottle, is seen in the Troglione patent, U.S. Pat. No. 3,726,404. The '404 patent reveals a dual reservoir transfer ozonation system, usable to disinfect a bottled water dispenser=s water. The primary differences in the '404 patent as opposed to the present embodiment are that Troglione required a dedicated water pump to pump water from a separate ozone bubble reactor reservoir reserve to the bottle and demonstrated no capacity to completely exchange the non-ozonated contents of the bottle with freshly ozonated reservoir water. Troglione '404 required a dedicated air pump for transferring ozone to the bubble reactor>s porous diffuser stone. The present invention provides other split-flow transfer options include running small diameter tubing through water courses that terminate immediately behind spigot valves for back flushing watercourses and exposed valve bodies with freshly ozonated water, thereby bleaching and washing any biofilms that might have formed in these stagnate, slow water mixing exchange areas. Such areas would not otherwise be exposed to high concentrations ozone unless freshly ozonated water were dispensed from cooler, which represents insufficient contacting time without sufficient water flow velocity to achieve a biofilm abrading effect. The bleaching and scrubbing of organic deposits with rising streams of ozone bubbles aimed at reservoir sidewalls by a gated ring diffuser is discussed in the Davis U.S. Pat. Nos. 6,085,540 and 6,389,690 for reservoir sidewall sanitisation.

Removal and bleaching of the reservoir floor or bottom wall area is most necessary as the loose sediment has no place to go except down the watercourses and out the spigot into an individuals drinking glass. In fact no other conventional form of diffusion presently in use can provide the stirring action and accompanying turbulence need to stir up sediment and strip biofilms from a reservoir base and beach them to an inert.

Small applications aerators of appropriate scale for cooler applications can be supplied by current manufacturers in two basic configurations: Firstly, in compact, short shafted units in housing's integrated with its prime mover suitable for below water level in reservoir mounting, inversion mount with only impeller stack and housing protruding through reservoir base or 90 degree sidewall mount, impeller and housing protruding through reservoir sidewall. In the case of a cooler reservoir outfitted with two tangential sidewall ports connected to supply tubing, one side serves as water inlet, the other as a water outlet with a mixing chamber located between the two terminal ends of tubing. An aerator is fixed to the external mixing chamber where water can be pumped, and shear mixed and siphoned ozone supply from ozonator can be siphoned across impeller, shear mixed and pumped into reservoir flowing in the preferred swirl around the reservoir perimeter. Ozone can be recycled through the aerator, with or without split stream transfer to the previously described critical areas.

Long hollow gas supply drive shafted units are suitable for exterior motor mounting to a point of use (POU) cooler reservoir cover or to the anti-spill device cover found on bottled water coolers where impellers and the associated housing project into the reservoir below water level.

Silva U.S. Pat. No. 3,382,980 discloses a radial flow aerator being used as primary ozone diffusion means in an on demand, partially continuous throughput water treatment system suitable for the needs of small municipalities. The reservoir was built expressly for this purpose. The Silva system has a dual reservoir, contactor separate form dispensing accumulation tank and water is not chilled in either tank and not the same utility.

Blender impellers (see e.g. to Zeff U.S. Pat. No. 3,843,521) are of the axial flow type, but differ from chemical engineering gas diffusion aerators in that the chemical engineering models feature housed impellers and gas tube supplying means and flow directed mixed phase flows that minimize or eliminate vortex and corresponding air core conduits from surface. The open impeller design of blenders in conjunction with the container geometry incorporated by Zeff cause cyclonic toroidal convection vortex flow in the aerator embodiment due to the potential of cooler flooding. The low density air core of a vortex can destabilize both a bottled water cooler and a float actuated point of use cooler's water supplying means, promoting uninterrupted water drainage into the cooler reservoir. This type of axial aerator is incapable of directing split flow streams to other parts of a cooler.

Several patents have issued that discuss the general concept of using ozone to sanitize drinking water contained in the reservoir of a water dispensing device, water cooler, or the like.

As examples, patents have issued that relate to the use of ozone for disinfecting drinking water that is to be dispensed. U.S. Pat. Nos. 6,085,540 entitled "Method and apparatus for disinfecting a water cooler reservoir"; 6,389,690 entitled "Method and apparatus for disinfecting a water cooler reservoir"; 6,532,760 entitled "Method and apparatus for disinfecting a water cooler reservoir"; 6,561,382 entitled "Method and apparatus for disinfecting a water cooler reservoir and its dispensing spigot(s)", each of said patents being incorporated herein by reference.

Other possibly relevant patents include Olsen U.S. Pat. No. 5,683,576 and Matsui U.S. Pat. No. 5,366,619.

BRIEF SUMMARY OF THE INVENTION

Ozone gas is generated and transmitted from a generator to an aerator pump impeller. The impeller is positioned either inside the dispenser reservoir and submerged below water level or in a recirculation loop channel. The channel can be in tangential connection with the dispenser=s reservoir. The channel is preferably positioned below a level that enables the ozone gas to be siphoned through a supply tube by a partial pressure differential. This differential is generated by both a flow stream and water intake cavitation dynamics generated by the impeller.

The ozone gas is then drawn by the impeller (or impellers) across its blades where the ozone gas phase is sheared and finely subdivided into bubbles. On some types of aerator pumps this ozone gas is further sheared to even finer dimensions when passing between an impeller housing and its impeller, or by passage through exit slots or screens provided across the housing=s discharge or out feed ports. Such very fine ozone bubbles dissolve more readily in the volume of a motional water flow stream contained in the reservoir. Such very small ozone bubbles can be used to disinfect the water and any exposed surfaces of the reservoir, as well as its associated watercourses and internal components below the water. Disinfection is by direct contact with the ozonated water and that above the waterline by direct contact with ozonated water vapor and gas phase exhaust ozone that develops during the process of ozonation.

The present invention provides an improved method and apparatus for sanitizing drinking water to be dispenser from a water dispenser having a reservoir.

The method includes the providing of an ozone gas generator that generates in an ozone gas stream. The ozone gas stream is transferred from the generator to the water dispenser reservoir.

Inside the reservoir, the ozone gas stream is mechanically broken up to produce ozone gas bubbles. These ozone gas bubbles are broken up sufficiently so that they are small enough to disinfect the reservoir. In the preferred embodiment, a pump can be used to mechanically break up the ozone gas stream inside the reservoir to produce very small ozone gas bubbles.

The pump can be a motor driven pump having a pump housing with one or more fluid inlets. The pump has an impeller that is placed inside the reservoir, the impeller breaking up the ozone gas stream as it flows from an inlet into the pump housing.

The pump also provides one or more discharge outlets with a discharge structure that can further break up the ozone exiting the pump.

The pump can include a pump impeller that has multiple vanes (see FIGS. 12-15). The pump discharge outlet can optionally provide a screen that covers all or part of the outlet to help break bubbles into very small pieces.

The method includes the further step of intaking water from the reservoir with the pump so that water and ozone mixed and circulated inside the pump housing.

The pump inlet(s) can include a water inlet and a gas or ozone inlet. The gas inlet can intake ozone, air, or a mixture of ozone and air.

As part of the method, the ozone gas stream can be sheared using an impeller and/or a screen or other structure that is placed at the pump discharge or spaced closely to the periphery of the impeller.

The present invention provides an improved water dispenser that includes a housing having a spigot for dispensing water. A flowline or conduit inside the housing supplies water to the spigot.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein:

FIG. 5 is a partial sectional elevation view of the preferred embodiment of the apparatus of the present invention illustrating an alternate pump arrangement;

FIG. 5A is a plan view of the pump arrangement of FIG. 5;

FIG. 6 is a partial sectional elevation view of the preferred embodiment of the apparatus of the present invention illustrating an alternate pump arrangement;

FIG. 6A is a plan view of the pump arrangement of FIG. 6;

FIG. 7 is a partial sectional elevation view of the preferred embodiment of the apparatus of the present invention illustrating an alternate pump arrangement;

FIG. 7A is a plan view of the pump arrangement of FIG. 7;

FIG. 8 is a partial sectional elevation view of the preferred embodiment of the apparatus of the present invention illustrating an alternate pump arrangement;

FIG. 8A is a plan view of the pump arrangement of FIG. 8;

FIG. 9 is a partial sectional elevation view of the preferred embodiment of the apparatus of the present invention illustrating an alternate pump arrangement;

FIG. 9A is a plan view of the pump arrangement of FIG. 9;

FIG. 10 is a partial sectional elevation view of the preferred embodiment of the apparatus of the present invention illustrating an alternate pump arrangement;

FIG. 10A is a plan view of the pump arrangement of FIG. 10;

DETAILED DESCRIPTION OF THE INVENTION

Figure 1:
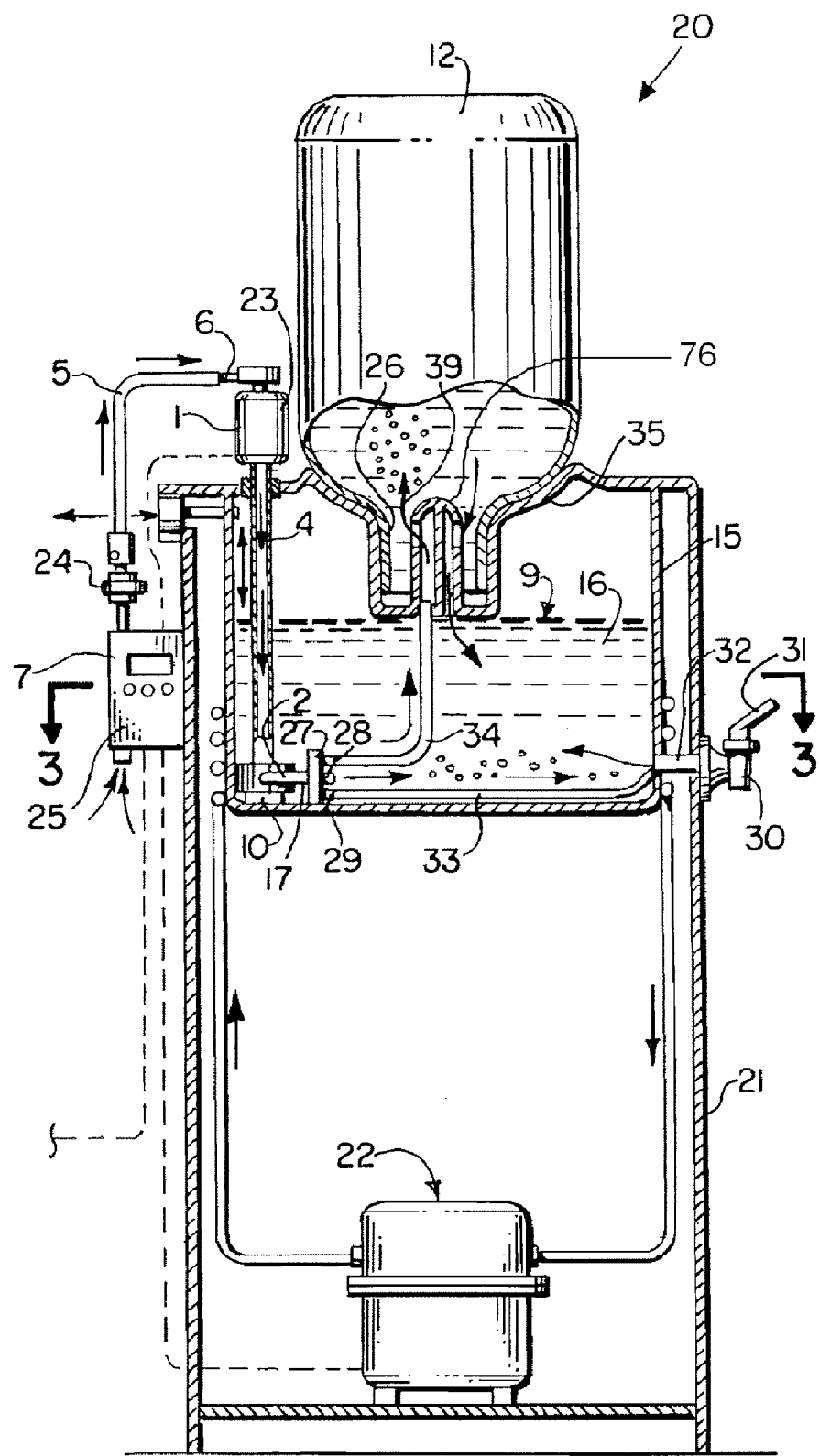
FIG. 1 is a sectional, elevation view of the preferred embodiment of the apparatus of the present invention.

Water dispenser 20 is shown in FIG. 1 as including cabinet 21 having a reservoir 15 for holding water 16 to be consumed by a user. Reservoir 15 has a sidewall and a bottom wall 19. Cabinet 21 can support a known, commercially available supply bottle 12 having neck outlet 26. Such a reservoir 15 containing water 16 is shown and described, for example, in U.S. Pat. Nos. 6,085,540; 6,389,690; and 6,532,760 each hereby incorporated herein by reference.

The present invention further provides an improved method for sanitizing drinking water to be dispensed from a water dispenser having a reservoir and further provides an improved water dispenser. Water dispenser 20 can be any known water dispensing device that typically uses a cabinet 21 that has reservoir 15 containing water 16. The cabinet can include known electrical components, known refrigeration system 22 and other components that are known. Hollow drive shaft is contained within a cylindrically shaped housing section 18 of housing 2. Pump 23 can include a housing 2 positioned inside reservoir 15 and below water level 9, being surrounded by water 16 to be sanitized and dispensed. Pump housing 2 contains impeller (see FIGS. 12-13) driven by hollow drive shaft 4 and motor 1. Pump 23 can be any of a number of different pump configurations as shown in FIGS. 1-4, 5-5A, 6-6A, 7-7A, 8-8A, 9-9A, 10-10A, 12-15.

An air supply tubing 5 can supply a combination of air and ozone to pump 23. Air supply tubing 5 connects to pump 23 at air supply barb 6. An ozone generator 7 connects to cabinet 21 (FIG. 1). Ozone generator 7 connects to tubing 5. Tubing 5 can provide filter 24. Ozone generator intakes air at inlet 25. The water=s surface of reservoir 15 provides an air water interface 9. Ozone bubbles that are emitted from pump discharge manifold 17 mix with water 16 and sanitize water 16 as well as reach the air water interface 9. Housing 2 provides multiple intakes including water intake 10 and gas intake 8 inside drive shaft 4.

Figure 3:
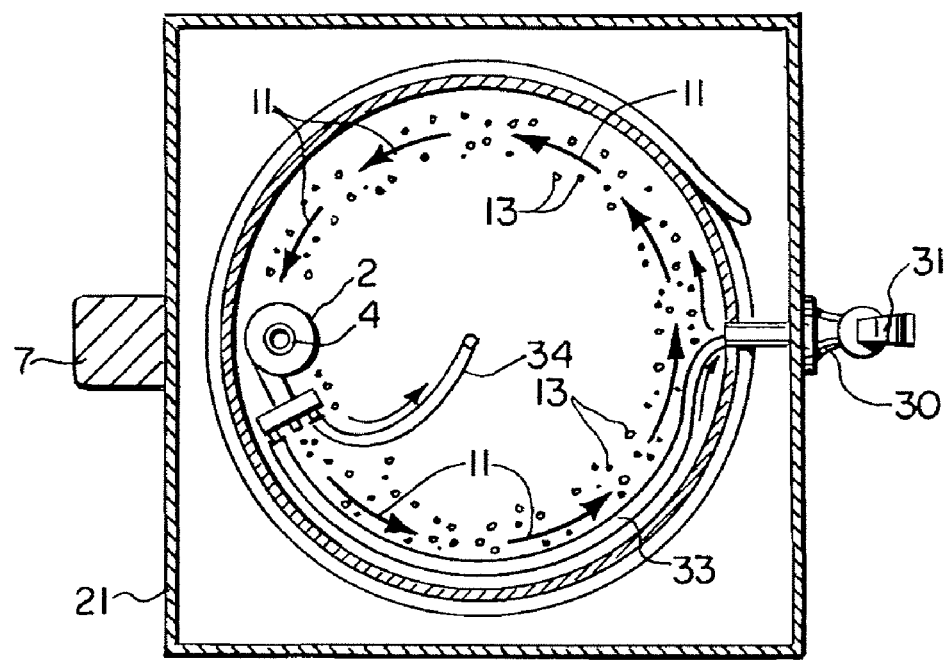
FIG. 3 is a sectional view taken along lines 3-3 of FIG. 1.

The arrows 11 in FIG. 3 schematically shows ozone gas bubbles mixing within the reservoir 15 thus providing ozone disinfection of water 16. The numeral 13 in figure illustrates very fine bubbles or a very fine bubble fraction undergoing contact diffusion with the surrounding water 16 for sanitizing the water 16.

The discharge manifold 17 is provided with three outlet ports 27, 28, 29. The outlet port 27 communicates with flowline 34 for transmitting ozone to bottled water supply 12 as indicated by arrows 39 in FIG. 1. The port 28 discharges ozone directly into reservoir 15 as indicated by arrow 38 so that ozone can be used to disinfect the bottom 36 of reservoir 15. Bottle 12 nests in an anti-spill receiver 35 that can be supplied with cabinet 21. The anti-spill receiver 35 includes a tube 76 that connects with the neck outlet 26 of bottle 12 as seen in FIG. 1. Such anti-spill receivers 35 are known.

Figure 11:
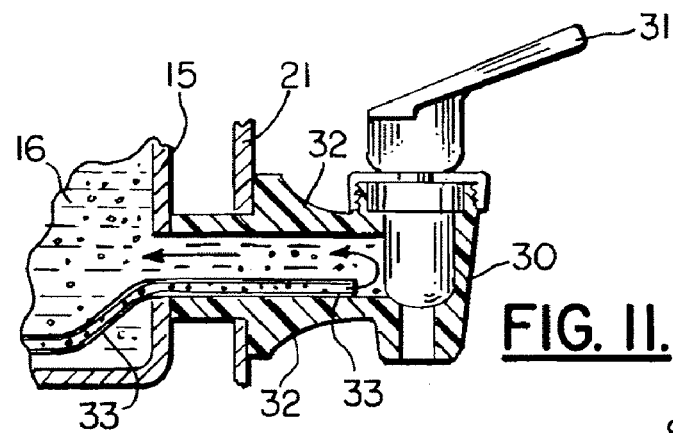
FIG. 11 is a sectional fragmentary view of the preferred embodiment of the apparatus of the present invention.

Cabinet 21 provides spigot 30 having handle 31, the spigot 30 being a known structure. Such spigots 30 are typically provided on commercially available water dispensers and communicate with water 16 and reservoir 15 via channel 32. Port 29 communicates with flowline 33 to provide ozone directly to spigot 30 for sanitizing it and its channel 32 (see FIGS. 1 and 11).

Figure 2:
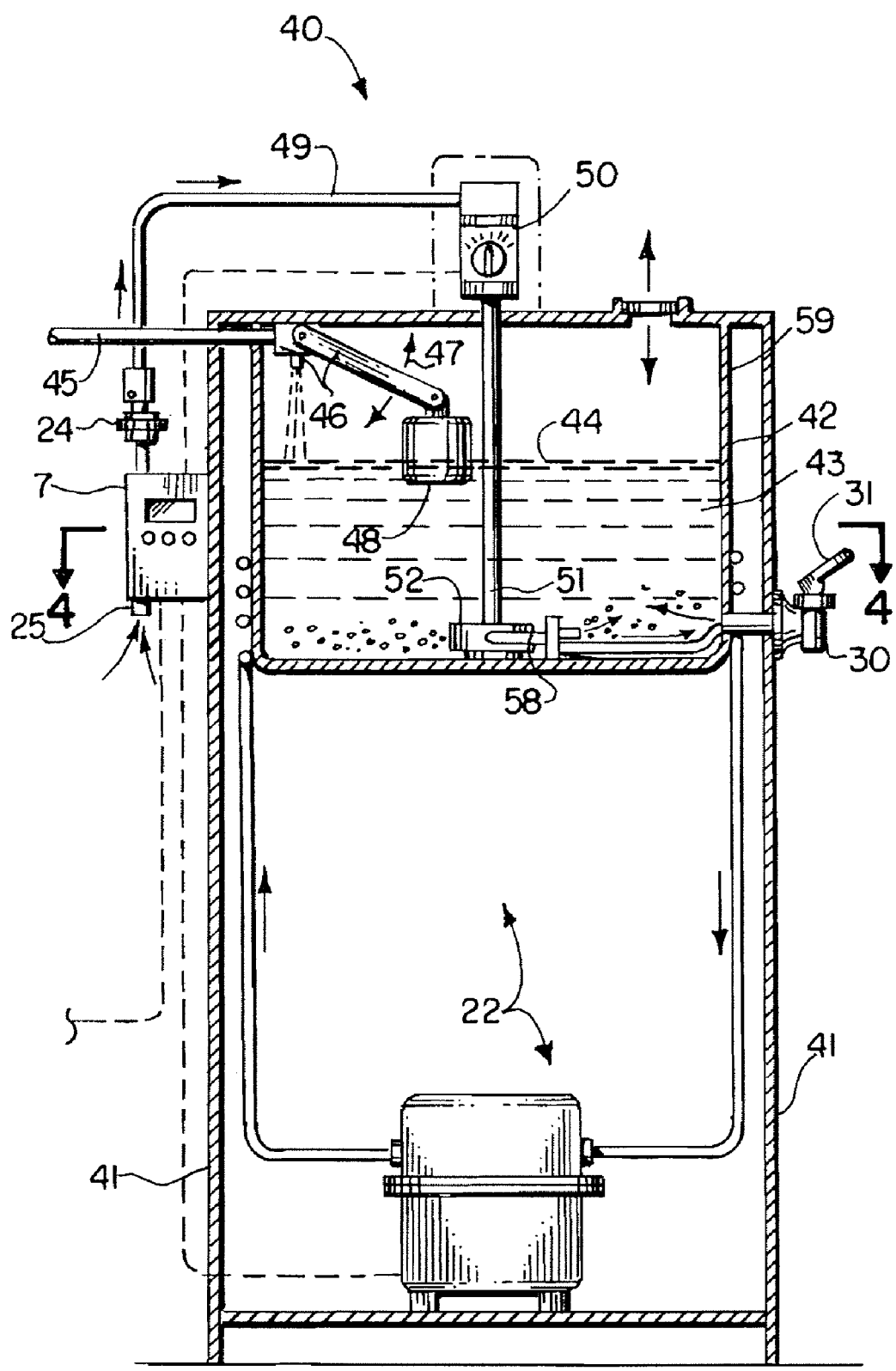
FIG. 2 is a sectional elevation view of a second embodiment.
Figure 4:
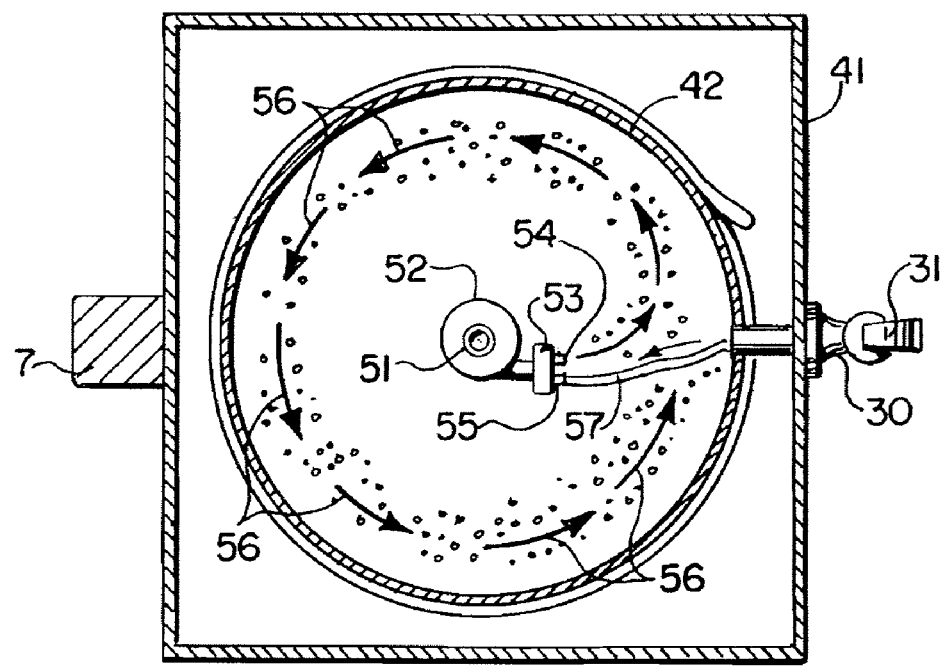
FIG. 4 is a sectional view taken along lines 4-4 of FIG. 2.

FIGS. 2 and 4 show an alternate construction of apparatus 10 of the present invention in the form of point of use (POU) dispenser 40. Point of use dispenser 40 provides a cabinet 41 having a reservoir 42 with a bottom 58 and sidewall 59. Reservoir 42 contains water 43 having water surface 44.

An influent flowline 45 communicates with float valve 46. Float valve 46 is commercially available, providing a float 48 that rises and falls with water level 44, the valve 46 being opened to discharge water into reservoir 42 when float 48 falls below a predetermined elevation. Arrows 47 in FIG. 2 illustrate the up and down movement of float 48 for opening and closing valve 46. When float 48 reaches a maximum elevation, it closes valve 46 halting the flow of fluid from flowline 45 to reservoir 42. Ozone generator 7 is mounted on cabinet 41. The ozone generator transmits ozone via flowline 49 to motor 50, then to motor drive shaft 1 and to housing 52. Motor 50 provides a motor shaft 51 which is hollow, the motor shaft 51 driving an impeller contained in housing 52 and also transmitting ozone that it receives via line 49 to pump housing 52. Housing 52 can include a cylindrically shaped section that surrounds drive shaft 51.

Pump housing 52 provides discharge manifold 53 having outlet ports 54, 55. As indicated by arrows 56 in FIG. 4, discharged ozone leaves outlet port 54 and mixes with the water 43 contained in reservoir 42. Discharge manifold 53 is positioned next to bottom wall 58 of reservoir 42 so that the discharged bubbles exiting port 54 scrub the bottom of 58 and sanitize it. Outlet port 55 communicates with flowline 57 for transmitting ozone to spigot 30.

Figure 12:
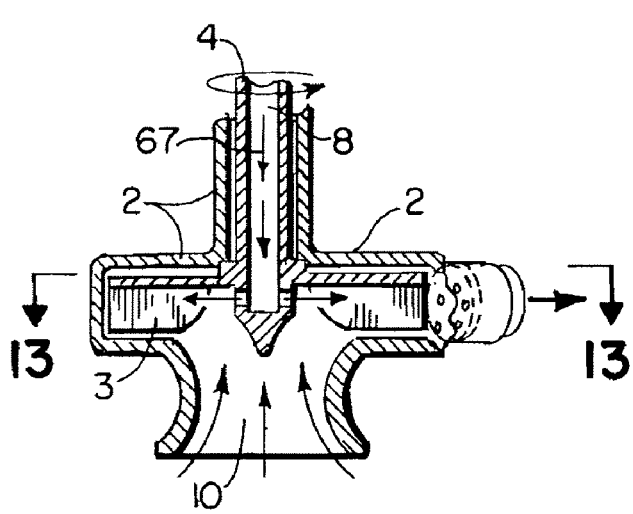
FIG. 12 is a fragmentary sectional elevation view of the preferred embodiment of the apparatus of the present invention illustrating an optional pump configuration.
Figure 13:
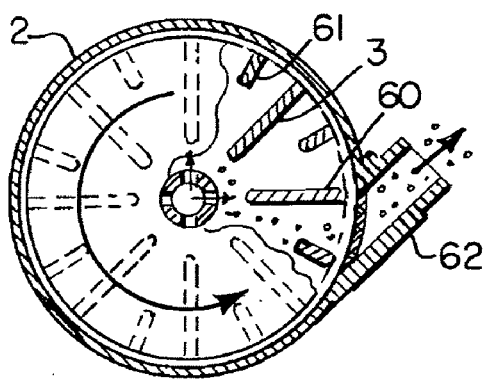
FIG. 13 is a sectional view taken along lines 13-13 of FIG. 12.

FIGS. 12-15 show exemplary impeller constructions. In FIGS. 12 and 13, housing 2 is provided with an impeller 3 that is comprised of a plurality of long radial vanes 60 and short radial vanes 61. Ozone enters housing 2 as indicated by arrows 67 in FIG. 12. Water enters housing 2 via intake 10 as indicated by arrows 68 in FIG. 12. Water and ozone mix as hollow drive shaft 4 is provided with openings 69 next to vanes 60, 61. The ozone mixes with water at the vanes 60, 61 forming a very fine bubble fraction that is discharged at mixed fluid outlet 62 to one of the discharge manifolds 17 or 53. Thus the impeller configuration of FIGS. 12 and 13 could be used in either the embodiment of FIG. 1 or the embodiment of FIG. 2. Likewise, the embodiment of FIGS. 14 and 15 could be used with either of the embodiments of FIGS. 1 and 2.

Figure 14:
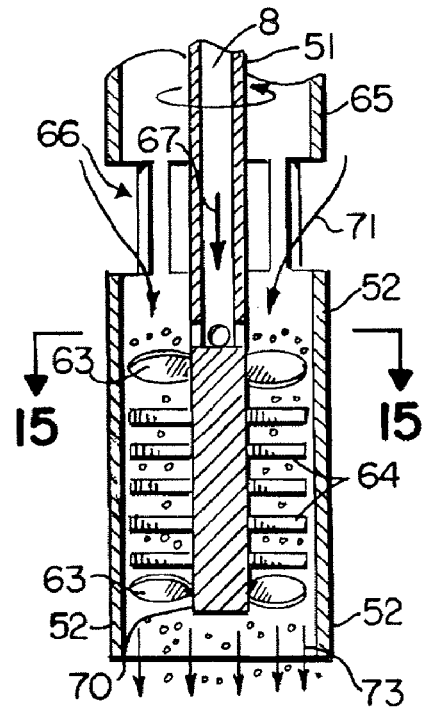
FIG. 14 is a fragmentary sectional elevation view of the preferred embodiment of the apparatus of the present invention illustrating an optional pump configuration.
Figure 15:
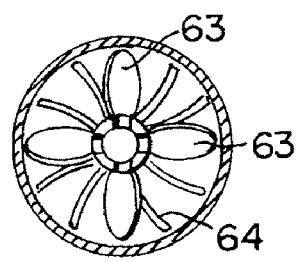
FIG. 15 is a sectional view taken along lines 15-15 of FIG. 14.

In FIG. 14, the housing 52 contains an impeller 70 mounted at the lower end portion of drive shaft 51. The impeller 70 has a plurality of blades 63 and a plurality of vanes 64. A plurality of push propeller blades 63 are provided, preferably at different elevations as shown in FIGS. 14 and 15. In addition, zero pitch shearing vanes 64 are attached to drive shaft 51 as shown in FIG. 14. Housing 52 provides one or more intake opening 66 for intaking water. Water intake is schematically illustrated by the arrow 71 in FIG. 14.

The ozone carried in hollow drive shaft 51 is indicated by arrow 67. Water indicated by arrow 71 mixes at the vanes 63, 64 and is discharged at outlet 72 as indicated by arrow 73.

FIGS. 5-5A, 6-6A, 7-7A, 8-8A, 9-9A and 10-10A illustrate various other configurations of the pump, its motor drive and discharge in relation to reservoir 15 and its contained water 16. These figures illustrate that numerous pump shaft, pump housing configurations can be used within the spirit of the present invention.

In FIGS. 5-5A, pump housing 2 is placed next to the periphery of reservoir 15.

In FIGS. 6-6A, the motor drive 1 is located at the bottom of reservoir 15 so that a very short drive shaft would be needed to form a connection between motor 1 and housing 2 and its impeller.

In FIG. 7, a submersible combination motor drive 1 and pump housing 2 is shown.

In FIGS. 8-8A, a recirculating loop defined by flowlines 74, 75 is disclosed. In FIGS. 9-9A, pump housing 2 is mounted to the inside surface of the side wall of reservoir 15. Motor drive 1 is mounted on the outside surface of reservoir 15. A drive shaft that connects motor drive 1 to pump housing 2 extends through the reservoir wall.

FIGS. 10-10A illustrate a motor 1 and housing 2 configuration such as that shown in FIGS. 12 and 13. The following is a list of suitable parts and materials for the various elements of the preferred embodiment of the present invention.

PARTS LIST

| Parts Number | Description |
| --- | --- |
| 1 | motor |
| 2 | pump housing |
| 3 | impeller |
| 4 | drive shaft |
| 5 | air supply tubing |
| 6 | air supply barb |
| 7 | ozone generator |
| 8 | gas intake |
| 9 | air/water interface |
| 10 | water intake |
| 11 | gas bubble and water mixing |
| 12 | supply bottle |
| 13 | fine bubble fraction |
| 14 | fluid flow arrow |
| 15 | reservoir |
| 16 | water |
| 17 | discharge manifold |
| 18 | cylindrical housing section |
| 19 | bottom wall |
| 20 | water dispenser |
| 21 | cabinet |
| 22 | refrigeration system |
| 23 | pump |
| 24 | filter |
| 25 | inlet |
| 26 | neck outlet |
| 27 | outlet port |
| 28 | outlet port |
| 29 | outlet port |
| 30 | spigot |
| 31 | handle |
| 32 | channel |
| 33 | flowline |
| 34 | flowline |
| 35 | anti-spill receiver |
| 36 | bottom |
| 37 | bottom |
| 38 | arrow |
| 39 | arrow |
| 40 | point of use dispenser |
| 41 | cabinet |
| 42 | reservoir |
| 43 | water |
| 44 | water surface |
| 45 | influent flowline |
| 46 | float valve |
| 47 | arrow |
| 48 | float |
| 49 | flowline |
| 50 | motor |
| 51 | shaft |
| 52 | housing |
| 53 | discharge manifold |
| 54 | outlet port |
| 55 | outlet port |
| 56 | arrow |
| 57 | flowline |
| 58 | bottom |
| 59 | side wall |
| 60 | long radial vane |
| 61 | short radial vane |
| 62 | mixed fluid flow outlet |
| 63 | push propeller blade |
| 64 | ozone pitch shearing vane |
| 65 | tubular housing section |
| 66 | water intake |
| 67 | arrow |
| 68 | arrow |
| 69 | opening |
| 70 | impeller |
| 71 | arrow |
| 72 | outlet |
| 73 | arrow |
| 74 | flowline |
| 75 | flowline |
| 76 | tube |

The foregoing embodiments are presented by way of example only; the scope of the present invention is to be limited only by the following claims.

The invention claimed is:

1. A water dispenser for supporting an inverted bottle containing water to be dispensed, said bottle having a tapered neck portion with a dispensing outlet, comprising:
   a cabinet having top and bottom portions, the top portion having a top opening and an upper water supply section with an anti-spill receiver that has a vertically oriented tube that connects with the neck of the bottle of water to be dispensed;
   a lower water supply section including a reservoir that has a reservoir side wall and that extends below the anti-spill receiver and the bottle of water to be dispensed, the anti-spill receiver tube being spaced inwardly of the reservoir side wall and extending below the cabinet top opening;
   the tapered neck portion being connectable to the anti-spill receiver by inverting the bottle of water and contacting the neck dispensing outlet of the bottle with the anti-spill receiver tube, wherein a portion of the tube extends into the dispensing outlet;
   an ozone generator that includes at least one ozone flow line;
   a pump connected to said ozone flow line for mixing ozone with water in said reservoir; and a flow line connecting said pump to said tube for directing an ozone-water mixture from said pump into the tapered neck portion of said bottle.

2. The water dispenser of claim 1, further comprising one or more spigots on the cabinet for dispensing water from the reservoir.

3. The water dispenser of claim 1, wherein the ozone flow line has an in line filter.

4. The water dispenser of claim 1, wherein the top portion the cabinet has a top panel and the ozone flow line enters the cabinet via the top panel.

5. The water dispenser of claim 1, wherein the ozone flow line enters the reservoir from a position above the top portion of the cabinet.

* * * * *